(12) United States Patent
Alvi et al.

(10) Patent No.: US 12,381,507 B2
(45) Date of Patent: Aug. 5, 2025

(54) THERMAL SENSING AND CONTROL OF A TRANSISTOR BOARD

(71) Applicant: GM Global Technology Operations LLC, Detroit, MI (US)

(72) Inventors: Muhammad Hussain Alvi, Troy, MI (US); Cherian A. Idicheria, Novi, MI (US); Brian A. Welchko, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 241 days.

(21) Appl. No.: 18/336,345

(22) Filed: Jun. 16, 2023

(65) Prior Publication Data

US 2024/0421747 A1 Dec. 19, 2024

(51) Int. Cl.
*H02P 29/68* (2016.01)
*B60L 53/22* (2019.01)

(52) U.S. Cl.
CPC .............. *H02P 29/68* (2016.02); *B60L 53/22* (2019.02); *B60L 2210/40* (2013.01)

(58) Field of Classification Search
CPC ...... H02M 3/158; H02M 1/32; H02J 2310/48; H02J 7/0029; H02J 7/0047; H02J 7/007192; B60L 2210/40; B60L 2200/26; B60L 15/08; B60L 2220/14; B60L 2240/525; B60L 50/51; B60L 2210/44; B60L 53/20; H03K 17/102; H03K 17/122; H03K 17/145; H03K 2217/0054; H02P 1/18; H02P 29/64; H02P 7/06; H02P 27/06; H02P 27/08; H02P 29/60; H02P 29/02; H02P 27/085; H02P 29/68; H02P 29/66; H02P 29/027; H02P 25/022; H02P 25/062; H02P 23/28; H02P 21/22; H02P 23/07; H02P 7/29; H02H 3/087; H01M 10/625; H01M 10/613; H01M 10/486; H01M 50/258; B60K 2001/005; B60K 1/00; B60K 1/02; H01L 2924/1305; H01L 2924/13091
See application file for complete search history.

(56) References Cited

U.S. PATENT DOCUMENTS

2007/0201176 A1* 8/2007 Yokai ................ H02M 7/53875
361/103

* cited by examiner

*Primary Examiner* — Antony M Paul
(74) *Attorney, Agent, or Firm* — CANTOR COLBURN LLP

(57) ABSTRACT

An electric motor circuit includes a motor controller having a plurality of gate drivers and an inverter configured to receive direct current (DC) power from a source and output alternating current (AC) power to an electric motor. The inverter includes a plurality of transistor elements. Each transistor element includes multiple transistors arranged on a transistor board. Multiple temperature sensors are configured to monitor a plurality of temperatures on each transistor element. The motor controller is configured to alter a pulse width modulation (PWM) control of a first subset of transistors on a first transistor element in response to a first subset of temperature sensors detecting a temperature exceeding a threshold temperature and a second subset of temperature sensors not detecting a temperature exceeding the threshold.

20 Claims, 6 Drawing Sheets

THERMAL SENSING AND CONTROL OF A TRANSISTOR BOARD

INTRODUCTION

The subject disclosure relates generally to circuit board design and control, and to operational control of transistors on the same.

Electric vehicles and hybrid electric vehicles include direct current (DC) power storage elements that provide operational power to motors. The motors in turn drive rotation of corresponding wheels. In order to provide the correct power from the DC power storage elements to the motors, the power is converted to alternating current (AC) using an inverter. Inverters generally take the form of a network of transistors that are actively controlled to generate a signal approximating a Sine wave.

In practice, each transistor within an inverter topology, or similar circuit, is constructed via a transistor board including an array of electrically parallel identical transistors with each transistor being connected to the same gate command. As used herein, a transistor element refers to a transistor illustrated in a circuit topology and is understood to include multiple constituent components. During operation, minor variations and tolerance differences can result in temperature gradients across the transistor board. The temperature gradients in turn result in hot spots and cold spots.

Existing temperature monitoring systems use a single temperature sensor positioned on the transistor board to monitor temperature at one location. The monitored temperature is assumed to represent the temperature of the entire transistor board. Systems using this form of monitoring position the sensor at or near the portion of the transistor board that is expected to be the hottest during conventional operations and an overheating threshold is set at the lowest temperature at which excessive heating of any transistor component is possible. When the detected temperature exceeds the threshold, the transistor board is deactivated (no current is provided to the transistor board) until a predefined condition (e.g., time, detected temperature threshold, etc.) has occurred. While the transistor board is deactivated, the circuit including the transistor element is required to operate without the transistor element or required to shut down entirely. In the case of an inverter, this typically results in the inverter being switched off until the transistor element was sufficiently cooled.

Accordingly, it is desirable to provide a system capable of identifying and responding to specific hot spots on a transistor board without requiring the circuit including the transistor element to be deactivated.

SUMMARY

In one exemplary embodiment an electric motor circuit includes a motor controller having a plurality of gate drivers, an inverter configured to receive direct current (DC) power from a source and output alternating current (AC) power to an electric motor, the inverter including a plurality of transistor elements, each transistor element comprising a plurality of transistors arranged on a transistor board, wherein a plurality of temperature sensors are configured to monitor a plurality of temperatures of each transistor element and wherein the motor controller is configured to alter a pulse width modulation (PWM) control of a first subset of transistors on a first transistor element in the plurality of transistor elements in response to a first subset of temperature sensors detecting a temperature exceeding a threshold temperature and a second subset of temperature sensors not detecting a temperature exceeding the threshold temperature.

In addition to one or more of the features described herein the plurality of transistors on each transistor element are arranged in a thermally symmetrical arrangement having a plurality of sets of thermally symmetrical regions.

In addition to one or more of the features described herein the thermally symmetrical arrangement comprises a single row linear array.

In addition to one or more of the features described herein the thermally symmetrical arrangement comprises a multi-row linear array, and wherein each thermally symmetrical region includes transistors in more than one row of the multi-row linear array.

In addition to one or more of the features described herein a number of temperature sensors in the plurality of temperature sensors is equal to total number thermally symmetrical regions.

In addition to one or more of the features described herein a number of temperature sensors in the plurality of temperature sensors is equal to a total number of sets of thermally symmetrical regions.

In addition to one or more of the features described herein each set of thermally symmetrical regions includes a single temperature sensor.

In addition to one or more of the features described herein altering a PWM control of a first subset of transistors on a first transistor element comprises at least one of skipping a pulse and reducing a width of a pulse of the PWM control to the first subset of transistors.

In addition to one or more of the features described herein altering the PWM control of the first subset of transistors on the first transistor element comprises one of maintaining the alteration for a predefined number of pulses and periodically altering a pulse according to a set period for a predefined number of pulses.

In addition to one or more of the features described herein altering the PWM control of the first subset of transistors on the first transistor element comprises reducing the width of the pulse of the PWM control to the first subset of transistors, and a magnitude of a reduction of the width of the pulse is dependent on a magnitude by which the detected temperature exceeds the threshold temperature.

In another exemplary embodiment a method of operating a motor drive inverter includes receiving, at a motor controller, a plurality of temperature readings from a plurality of transistors on a transistor board, the transistor board operating as a transistor element of an inverter, and altering a pulse width modulation (PWM) control of a first subset of the transistors on the transistor board in response to one of the temperature readings in the plurality of temperature readings exceeding an overheating threshold.

In addition to one or more of the features described herein altering the PWM control comprises at least one of skipping one or more pulses and reducing a pulse width of one or more pulses.

In addition to one or more of the features described herein reducing a pulse width of one or more pulses comprises reducing the pulse width by a magnitude corresponding to a magnitude by which the one of the temperature readings exceeds the overheating threshold.

In addition to one or more of the features described herein altering the PWM control comprises skipping at least one pulse at a periodic rate until the temperature reading falls below a second threshold.

In addition to one or more of the features described herein a number of temperature readings in the plurality of temperature readings is equal to a number of sets of thermally symmetrical regions on the transistor board, and wherein the motor controller determines a temperature at each thermally symmetrical region in one set of the thermally symmetrical regions to be a single temperature reading.

In addition to one or more of the features described herein the thermally symmetrical regions include disjoined regions.

In addition to one or more of the features described herein the transistors are positioned on the transistor board in a single row array.

In addition to one or more of the features described herein the transistors are positioned on the transistor board in a multi-row array.

In addition to one or more of the features described herein altering the PWM control of the first subset of the transistors on the transistor board further comprises maintaining standard PWM control of at least a second subset of the transistors on the transistor board.

In addition to one or more of the features described herein altering the PWM control of the subset of the transistors on the transistor board further comprises altering a third subset o the transistors on the transistor board, the PWM control of the third subset being altered in a different way that the PWM control of the first subset is altered.

In another exemplary embodiment, a vehicle includes an energy storage system and a propulsion system including an electric motor, the propulsion system including an electric motor circuit for the electric motor, wherein the electric motor circuit includes a motor controller having a plurality of gate drivers, an inverter configured to receive direct current (DC) power from a source and output alternating current (AC) power to an electric motor, the inverter including a plurality of transistor elements, each transistor element comprising a plurality of transistors arranged on a transistor board, wherein a plurality of temperature sensors are configured to monitor a plurality of temperatures of each transistor element and wherein the motor controller is configured to alter a pulse width modulation (PWM) control of a first subset of transistors on a first transistor element in the plurality of transistor elements in response to a first subset of temperature sensors detecting a temperature exceeding a threshold temperature and a second subset of temperature sensors not detecting a temperature exceeding the threshold temperature.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
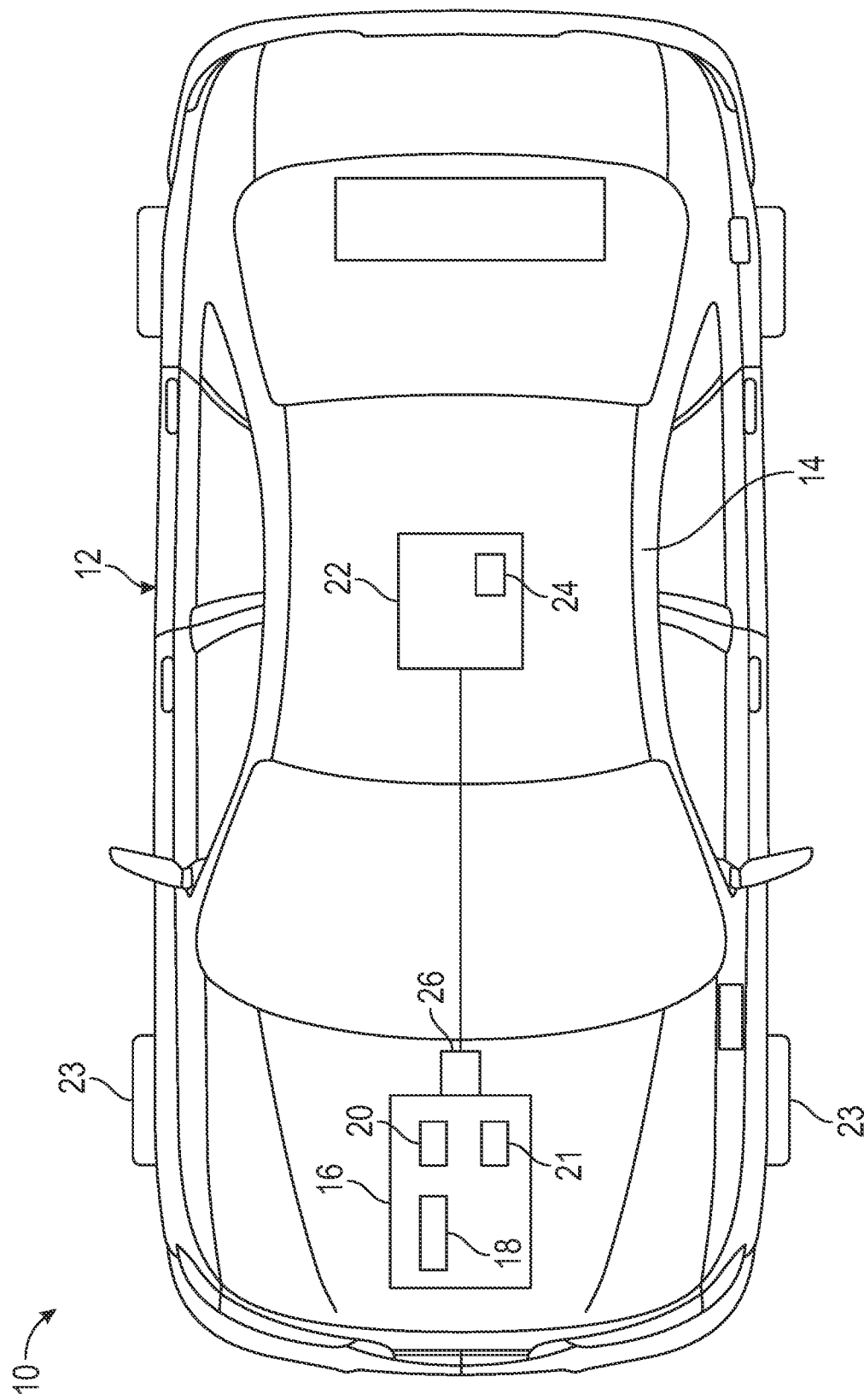
FIG. 1 is a motor vehicle embodying features of the present disclosure.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, a circuit, such as a motor drive inverter for a vehicle, includes multiple transistor elements. Each of the transistor elements is made up of a transistor board including multiple electrically parallel transistors that are physically distributed on the transistor board. Multiple temperature sensors are disposed on the transistor board, with the temperature sensors being positioned proximate the transistors and being configured to determine temperatures at multiple transistors on the transistor board. When a temperature limit is detected at one or more of the temperature sensors, a controller determines a corresponding altered pulse width modulation (PWM) operation of the transistor components on the transistor board. The corresponding altered PWM operation allows the overheating region of the transistor board to cool, while simultaneously allowing operation of the high-level circuit including the transistor element to continue.

With continued reference to the general system and operation described above, FIG. 1 shows an embodiment of a motor vehicle 10 configured to detect and respond to multiple distinct temperatures of the transistor on the transistor board. The vehicle 10 includes a vehicle body 12 defining, at least in part, an occupant compartment 14. The vehicle body 12 also supports various vehicle subsystems including a propulsion system 16, a battery system 22, and other subsystems to support functions of the propulsion system 16 and other vehicle components, such as a braking subsystem, a suspension system, a steering subsystem, a fuel injection subsystem, an exhaust subsystem and others.

The vehicle 10 may be a combustion engine vehicle, an electrically powered vehicle (EV) or a hybrid vehicle. In an embodiment, the vehicle 10 is a hybrid vehicle that includes a combustion engine system 18 and at least one electric motor assembly. For example, the propulsion system 16 includes a first electric motor 20 and a second electric motor 21. The motors 20 and 21 may be configured to drive wheels 23 on opposing sides of the vehicle 10. Any number of motors positioned at various additional locations about the vehicle 10 may be used to provide mechanical rotation to corresponding systems and subsystems.

The battery system 22 may be electrically connected to the motors 20 and 21 and/or other components, such as vehicle electronics. The battery system 22 may be configured as a rechargeable energy storage system (RESS), and includes multiple cells partitioned into subsets.

A battery system controller 24 is included within the battery system 22 and controls the charging and discharging functions of the batteries within the battery system 22. In alternative configurations, the battery system controller 24 can be a general vehicle controller remote from the battery system 22 and configured to control multiple systems and/or subsystems. The general vehicle controller can be located at any position within the vehicle 10. In yet further alternatives, the controller 24 can be a distributed control system including multiple coordinating controllers throughout the vehicle 10 encompassing controllers within the battery system 22 and controllers remote from the battery system 22.

In order to provide operational power from the battery system 22 to the motors 20, 21 and thereby drive the wheels 23 to rotate, direct current (DC) power provided from the battery system 22 is converted to alternating current (AC) power using one or more inverters 26. The one or more inverters 26 use a network of actively switched transistor elements, controlled by gate drivers, to convert the DC power to an approximate sine wave using conventional inverter topologies and control systems.

Figure 2:
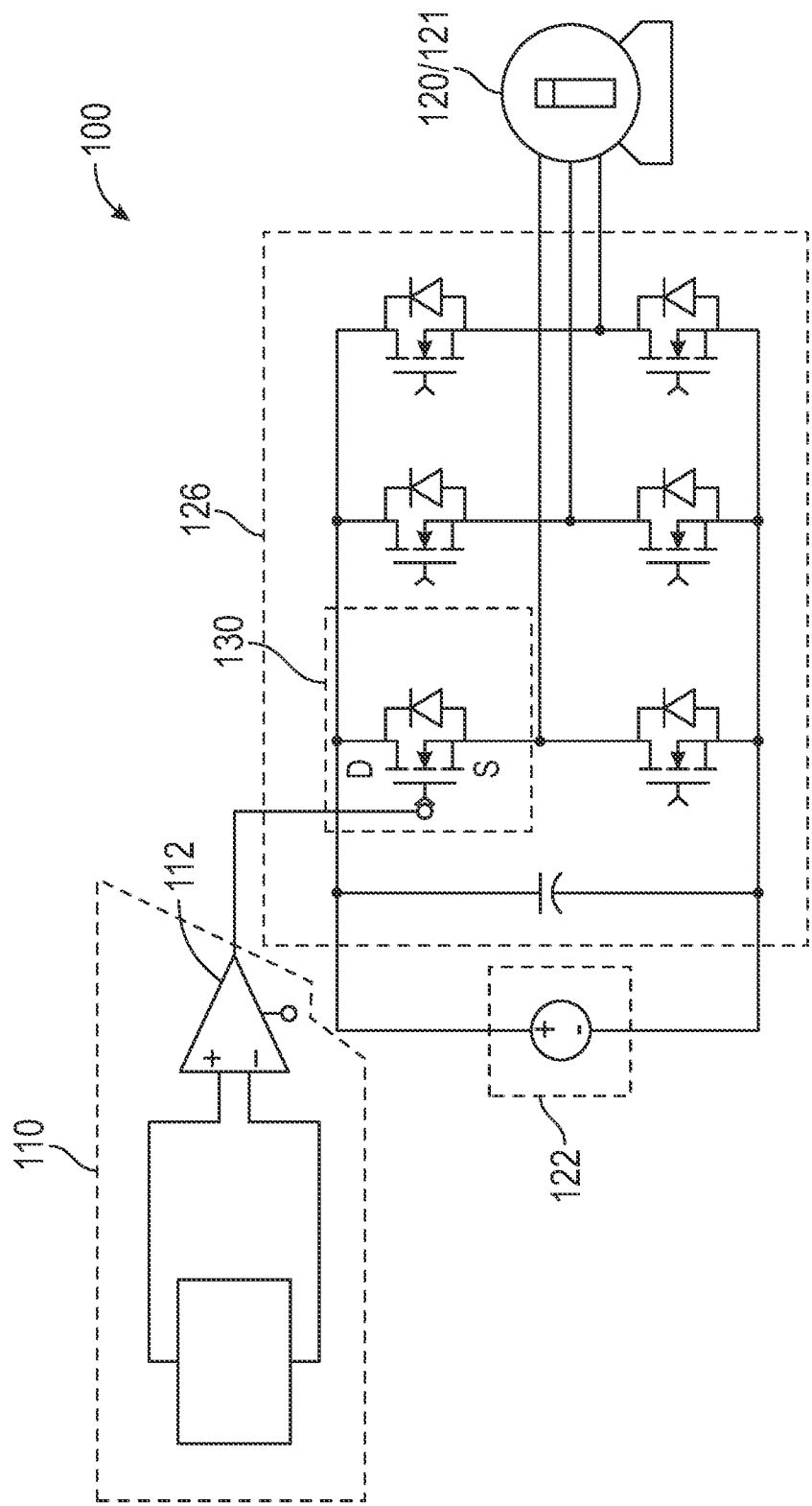
FIG. 2 is a motor drive circuit for the vehicle of FIG. 1.

With continued reference to FIG. 1, FIG. 2 illustrates an exemplary motor drive circuit 100 including a battery system 122 connected to a motor 120/121 via an inverter 126. The inverter 126 is controlled via a controller 110. The exemplary inverter 126 is arranged as a basic three phase inverter, however it is appreciated that the systems and processes described herein can be applied to any inverter topology utilizing multiple transistor elements and are not limited to the exemplary topology, nor are they limited to the exemplary inverter application of a motor drive inverter.

Within the inverter 126 are multiple transistor elements 130. Each transistor element 130 is schematically illustrated as a single transistor with a drain D and a source S. In practice each transistor element 130 illustrated in the topology is constructed of a transistor board 240 (see FIG. 3), 440 (See FIG. 5) with multiple transistors arranged in electrical parallel, and physically distributed about the transistor board 240, 440. Similarly, the schematic controller 110 includes a singular gate driver 112 for each transistor element 130. It is appreciated that in practice the number of gate drivers 112 for a transistor element 130 can be increased, providing for finer control with the actual number of gate drivers 112 corresponding to a number of control regions on the transistor board 240, 440 and at most a number of gate drivers equal to the number of transistor elements. The controller 110 uses a pulse width modulation (PWM) control signal provided by the gate driver 112 with a positive voltage output from the gate driver 112 turning the transistor element 130 on (closed) and a zero voltage output from the gate driver 112 turning the transistor element 130 off (open).

The transistor elements 130, as with any other electrical component, do not have a 100% efficiency. A portion of the current passing through any given portion of the constituent electronics of the inverter 126 is converted to heat energy. Continued operation of the inverter 126 results in a buildup of heat, which in turn can result in an overheating condition. Sustained operation of a transistor under an overheating condition can damage the transistor and/or can affect the performance of the surrounding components. In order to monitor the heat, temperature sensors 250, 450 (See FIGS. 3, 5) are included on each transistor element 130, and the controller 110 alters the PWM operation of a given transistor element 130 to allow for the transistor element 130 to cool when an overheating condition is detected.

Figure 3:
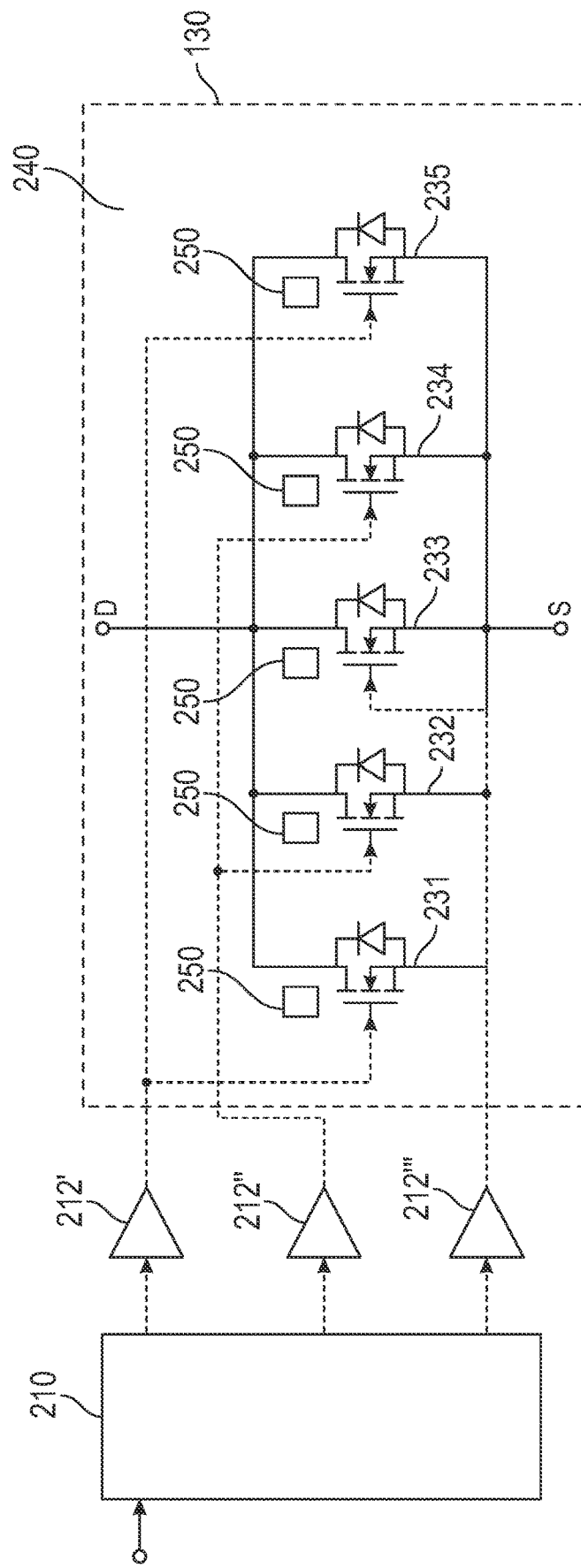
FIG. 3 is a transistor board for the motor drive circuit of FIG. 2 according to one example.

With continued reference to FIG. 2, FIG. 3 illustrates one example transistor element 130 (corresponding to a transistor element 130 of FIG. 2) operated by a controller 210 having multiple gate drivers 212', 212'', 212''' (collectively referred to as gate drivers 212). The transistor element 130 includes fives transistors 231, 232, 233, 234, 235 arranged linearly on a physical transistor board 240. The physical transistor board 240 can be a distinct printed circuit transistor board, a portion of a larger printed circuit transistor board, an application specific integrated circuit (ASIC), multiple connected physical boards or any other physical structure for mounting and connecting the transistors 231, 232, 233, 234, 235.

During operation, the transistors 231, 232, 233, 234, 235 generate heat which builds up on the transistor board 240. In some examples, due to the physical layout of the transistor board 240, the heat builds up faster in some areas than others resulting in an uneven distribution of heat. Transistors that are positioned in the relatively cool areas of the transistor board 240 can continue to operate even while transistors in a hot portion of the transistor board 240 are overheating. When the transistors are distributed in an area, such as the illustrated linear array, the region near the center (e.g., proximate transistor 233) tends to be the hottest, the region near the edge (e.g. transistors 231 and 235) tends to be the coolest.

Transistors in corresponding thermal positions are referred to as being in symmetrical positions (e.g., the transistors 231, 235 at the edges are symmetrical, and the transistors 232, 234 between the edge and the center are symmetrical). Each transistor 231, 232, 233, 234, 235 in symmetrical positions shares a control signal with the other transistors 231, 232, 233, 234, 235 that it is symmetrical with. Further, the symmetrical positions tend to generate heat at the same rate and are referred to as being thermally symmetrical. Based on this principle, a single temperature sensor 250 can be included in each symmetrical region in some examples. Further, thermal symmetry can include any regions of the transistor board 240 that accumulate and discharge heat at the same rate and are not limited to physically symmetrical regions. Thermal symmetricity of a given transistor board layout can be determined via simulations, empirical testing, or a combination of the two. While illustrated herein as temperature sensors mounted to the transistor board 240, it is appreciated that alternative forms can be implemented using temperature sensors that detect the temperature without being directly mounted. By way of example, one such sensor is an IR temperature sensor.

In the illustrated example, individual temperature sensors 250 are positioned proximate each transistor 231, 232, 233, 234, 235. In alternate examples, sensors 250 could be included proximate the transistors 231, 232, 233 on one side of the transistor board 240, and the controller 210 assumes, based on thermal symmetry, that the temperature of symmetrical transistors (transistor 231 is symmetrical with transistor 235, and transistor 232 is symmetrical with transistor 234) are approximately identical.

Each transistor 231, 232, 233, 234, 235 is controlled via a gate current output by the connected gate driver 212. While no overheating condition is present, the transistors 231, 232, 233, 234, 235 are controlled via a conventional PWM signal, with all transistors 231, 232, 233, 234, 235 on the transistor board 240 receiving the same PWM signal simultaneously. Thus, the transistors 231, 232, 233, 234, 235 operate as a single unit, and are electrically identical to the single schematic transistor element 130.

When an overcurrent condition is detected at one of the sensors 250, but not all of the sensors 250, the controller 210 alters the PWM operation for the transistors 231, 232, 233, 234, 235 corresponding to the detected over temperature. The altered operation varies depending on the transistor and the varied temperatures from the sensors 250.

With continued reference to FIG. 1-3, FIG. 4 illustrates an exemplary set of PWM signals output from the gate drivers 212' 212', 212''' in response to an overheating condition being detected at the temperature sensor 250 corresponding to the transistors 233 at the center of the transistor board 240 and a hot, but not overheating, condition being detected at the adjacent transistors 232, 234.

Prior to the overheating condition being detected, each pulse 310 lasts for the same duration (t). When the overheating condition is detected, the controller 210 causes the gate drivers 212' corresponding to the transistors that are not overheating to continue to operate as normal by maintaining the same pulse width. Simultaneously, the transistor(s) 233 in the overheating region skip a pulse entirely and the overheating region is allowed to cool for one pulse. Furthermore, in order to provide more time between pulses for a hot but not overheating region to cool, the gate driver 212" is controlled by the controller 210 to output a shorter pulse by initiating the pulse 312 at a later time and ending the pulse 312 at an earlier time than the standard pulses 310. In the illustrated example, the shortened pulse 312 remains centered, with the same amount of time being truncated from the beginning and end of the standard pulse 310 to create a reduced width pulse.

Figure 4:
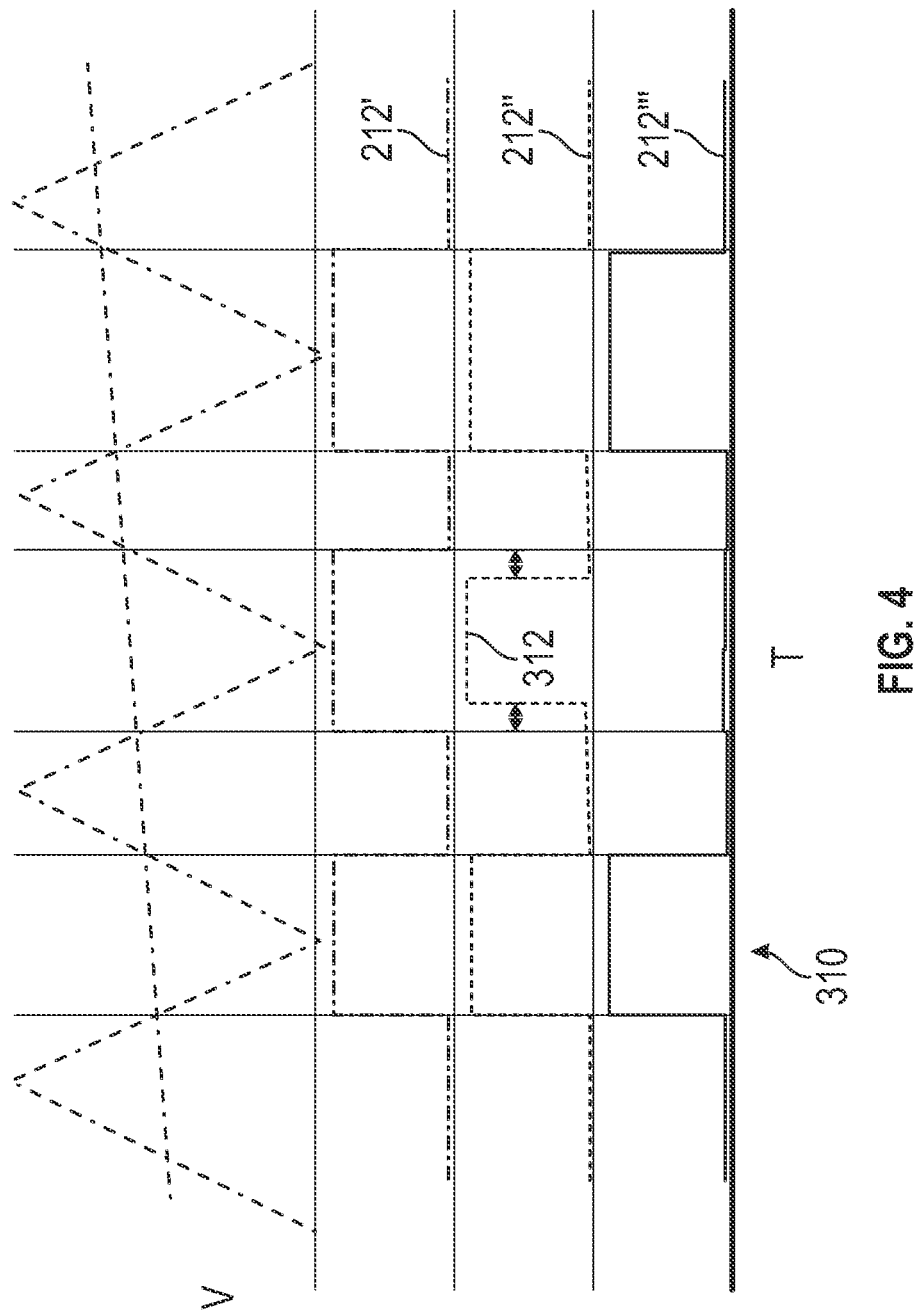
FIG. 4, is a pulse width modulation operation for the transistor board of FIG. 3, during a high temperature event.

In the example of FIG. 4, the altered PWM operation 312 is maintained for a single pulse, and operations are resumed at the next pulse. In a practical implementation, the PWM operation can be altered at a constant alteration for a set number of pulses (e.g., a reduced duration pulse for five pulses), altered in a periodic alteration with alternating regular pulses and altered pulses, an altered pulse every third pulse, etc., or any similar alteration. In some examples, the alteration can be constantly reevaluated based on a current temperature reading from the sensors 250.

Current flow through the transistor element 130 during the altered operation behaves the same as during a normal operation, as current is redirected through the fully on transistors 231, 235, and the reduced cycle width transistors 232, 234 due to the parallel connections of the transistors 231, 232, 233, 234, 235. Thus, while operating in the altered pulse form, the transistor element 130 provides normal transistor operations for the inverter 126 including the transistor element 130. The altered operations allow for the inverter 126 to maintain uninterrupted standard operations while simultaneously allowing temperatures on the transistor board 240 for each transistor element 130 to be equalized and maintained below an overtemperature threshold.

With continued reference to FIGS. 1-4, FIG. 5 illustrates an alternate layout transistor board 440 including eight transistors 431, 432, 433, 434, 435, 436, 437, 438 arranged in two rows and disposed evenly across the transistor board 440. The transistors 431, 432, 433, 434, 435, 436, 437, 438 are controlled via a controller 410 directing gate drivers 412 to switch the transistors 431, 432, 433, 434, 435, 436, 437, 438 on and off.

The transistor board 440 includes two thermal symmetry regions 442, 444, with a center thermal symmetry region 442 encompassing the center four transistors 432, 433, 436, 437, and an outer thermal symmetry region 444 encompassing the outer four transistors 431, 434, 435, 438. All transistors 431, 432, 433, 434, 435, 436, 437, 438 within a single thermal symmetry region 442, 444 are controlled by a single corresponding gate driver 412', 412".

The outer thermal symmetry region 444 is disjoined, meaning that there are two separated regions included within the thermal symmetry region 444. The two separated regions heat, and cool, at the same rate during operation. Within each thermal symmetry region 442, 444 is a single temperature sensor 450. The temperature sensor 450 in the disjoined thermal symmetry region 444 can be positioned in either portion of the thermal symmetry region 444, and the optional alternate position 450' is illustrated via a dashed component. In one example, the thermal sensors 450 are positioned at a point in each thermal symmetry region 442, 444 where the transistor board 440 is most likely to generate heat. In another example, the thermal sensor 450 is positioned at a location able to determine the temperature of the most possible transistors 431, 432, 433, 434, 435, 436, 437, 438 within the thermal symmetry region 442, 444 being monitored by the thermal sensor 450.

Figure 6:
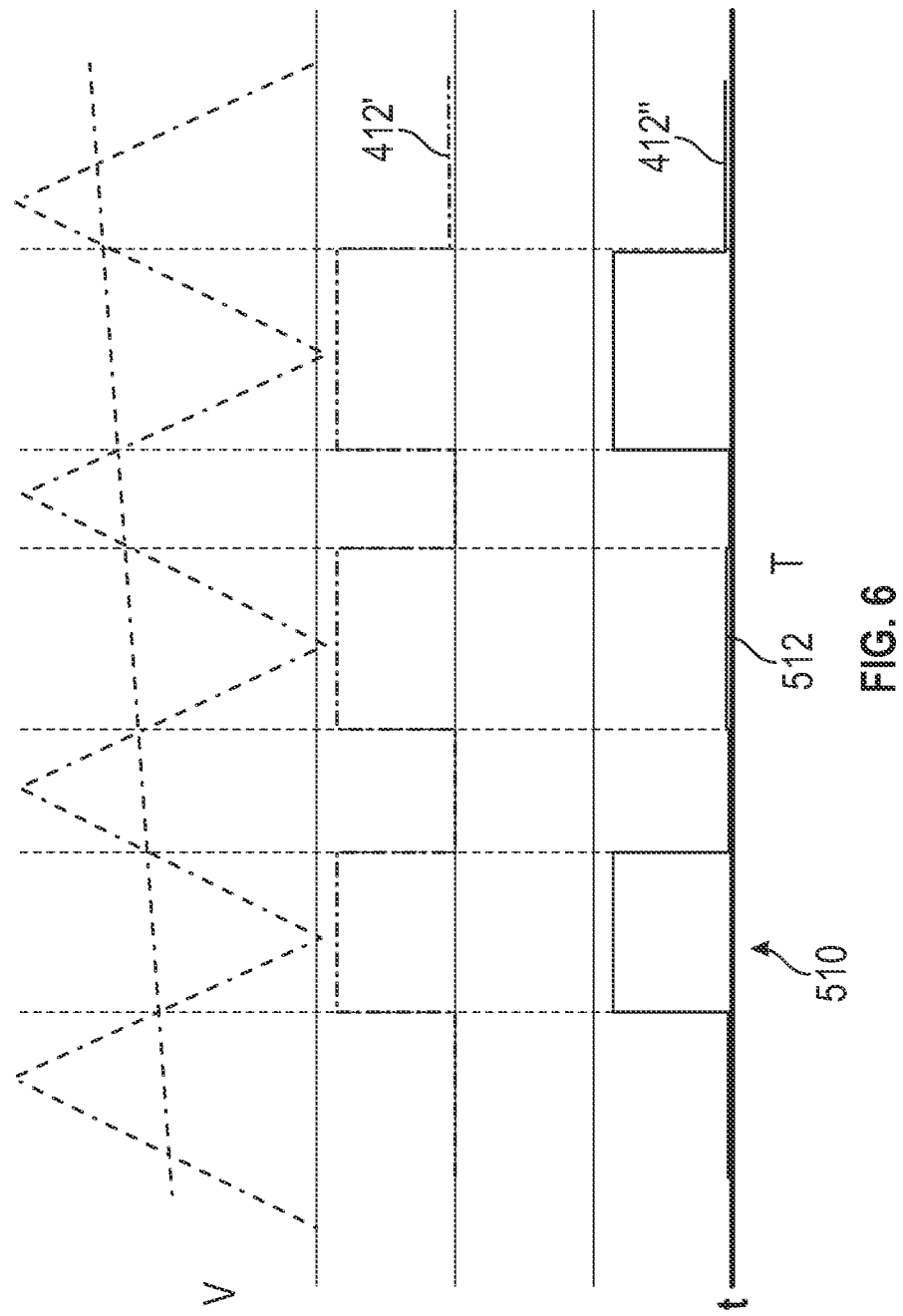
FIG. 6 is a pulse width modulation operation for the transistor board of FIG. 6, during a high temperature event.

During operation, when one of the thermal sensors 450 detects an overheat beginning in the corresponding thermal symmetry region 442, the PWM operation output by the corresponding gate driver 412 is altered such that the PWM signal provided to the transistors 432, 433, 436, 437 in the corresponding thermal symmetry region 442 alternates between a full pulse 510 and a skipped pulse 512, FIG. 6. As with the example of FIGS. 3 and 4, the particular alteration to the PWM output can include periodic pulse skipping, singular pulse skipping, skipping multiple sequential pulses, decreasing a pulse width of the pulses, a combination of pulse skipping and pulse shortening, or any similar alteration that decreases the time that the overheating thermal symmetry region receives current.

In some examples, the PWM alteration is predefined within the controller 210, 410 and the controller 210, 410 will always provide a consistent altered PWM signal to the corresponding transistors in response to a specific sensor detecting an overheat condition. In alternate examples, the controller 210, 410 can alter the PWM in a manner dependent on the specific outputs of the thermal sensors 250, 450. By way of example, a PWM output can be set to decrease the pulse width based on how much the temperature sensor has exceed a defined temperature threshold, with a greater temperature corresponding to a shorter pulse width up to a max where the pulses are skipped entirely.

Figure 5:
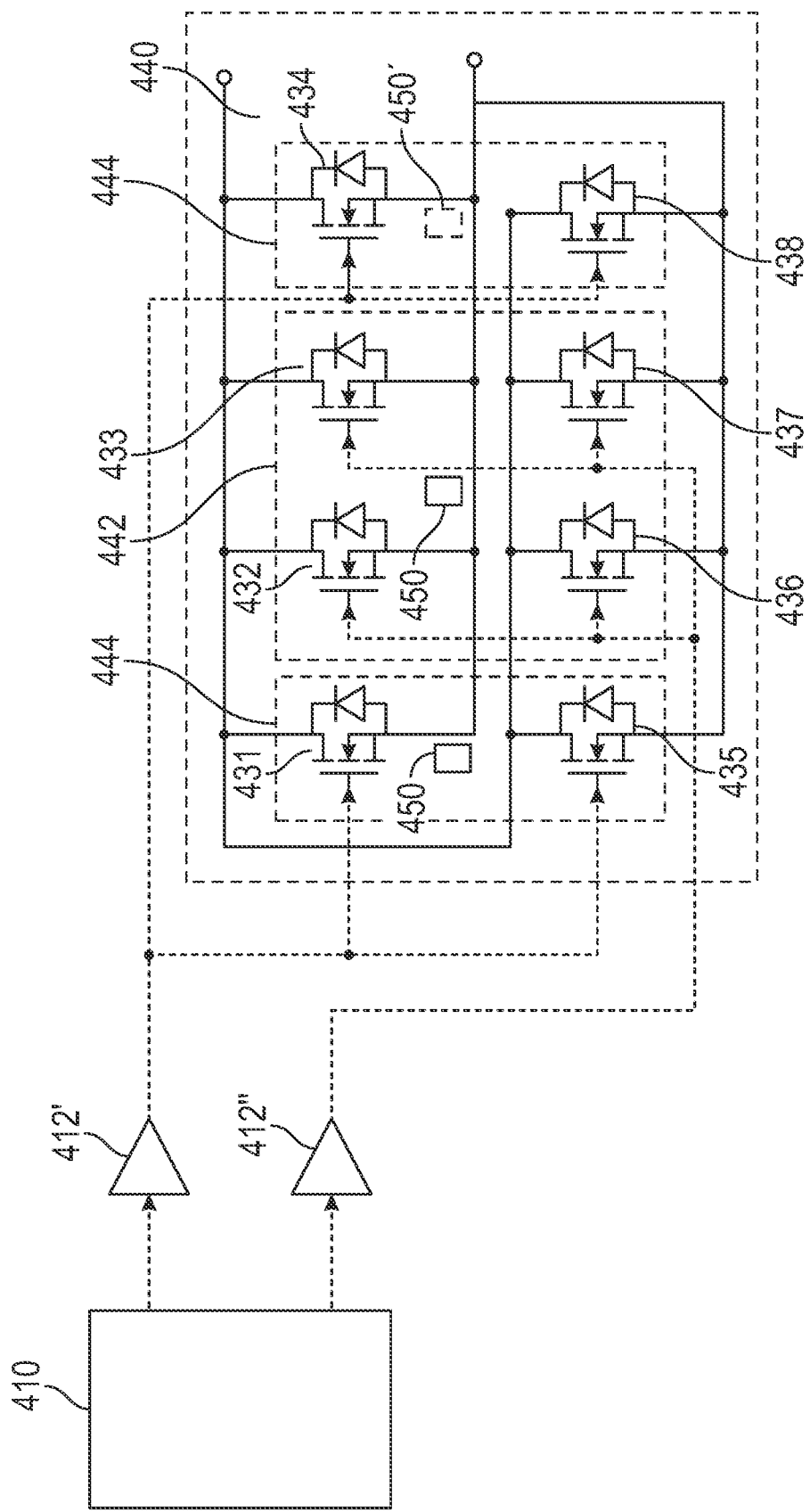
FIG. 5 is an alternate transistor board for the motor drive circuit of FIG. 2.

With reference to both FIG. 3 and FIG. 5, it is appreciated that the positioning of the transistor components on a given transistor board 240, 440 can be designed with particular thermal profiles in mind. By way of example, a single row linear layout (e.g., the linear layout illustrated in FIG. 3) can maximize the individual control of the transistors while using thermal symmetry. Similarly, a multi-row array of transistor components (e.g., the double row linear layout of FIG. 5) can minimize the number of temperature sensors required, as well as the corresponding number of gate drivers required.

The incorporation of the temperature sensing and control capability within a motor drive inverter allows for a substantial improvement to the switching cycles, current, torque, and loss profiles of the electric motor by allowing the inverter 126 to continue operating while one or more transistor components within a transistor element are experiencing high temperatures or overheating. By way of example, a load current can be modulated to achieve hysteresis control of a temperature while allowing for multiple bursts of torque which would conventionally result in overheating. In addition, single torque bursts having a well defined profile are possible within the same control system. This in turn can allow for longer acceleration times without requiring a thermal shut down due to transistor overheating.

Furthermore, in some inverters, or similar electrical modules, the temperatures across a given board can vary as much as 25C. In systems operating with a single temperature sensor and a single temperature threshold, the temperature variation can result in a power rating reduction (derating) of the component by up to 15%. Implementing the multiple temperature sensor and adjusted PWM controls described herein equalizes the temperature across the transistor board, and reduces the magnitude of the power rating reduction.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An electric motor circuit comprising:
   a motor controller having a plurality of gate drivers;
   an inverter configured to receive direct current (DC) power from a source and output alternating current (AC) power to an electric motor, the inverter including a plurality of transistor elements;
   each transistor element comprising a plurality of transistors arranged on a transistor board, wherein a plurality of temperature sensors are configured to monitor a plurality of temperatures of each transistor element; and
   wherein the motor controller is configured to alter a pulse width modulation (PWM) control of a first subset of transistors on a first transistor element in the plurality of transistor elements in response to a first subset of temperature sensors detecting a temperature exceeding a threshold temperature and a second subset of temperature sensors not detecting a temperature exceeding the threshold temperature.

2. The electric motor circuit of claim 1 wherein the plurality of transistors on each transistor element are arranged in a thermally symmetrical arrangement having a plurality of sets of thermally symmetrical regions.

3. The electric motor circuit of claim 2, wherein the thermally symmetrical arrangement comprises a single row linear array.

4. The electric motor circuit of claim 2, wherein the thermally symmetrical arrangement comprises a multi-row linear array, and wherein each thermally symmetrical region includes transistors in more than one row of the multi-row linear array.

5. The electric motor circuit of claim 2, wherein a number of temperature sensors in the plurality of temperature sensors is equal to total number thermally symmetrical regions.

6. The electric motor circuit of claim 2, wherein a number of temperature sensors in the plurality of temperature sensors is equal to a total number of sets of thermally symmetrical regions.

7. The electric motor circuit of claim 6, wherein each set of thermally symmetrical regions includes a single temperature sensor.

8. The electric motor circuit of claim 1, wherein altering a PWM control of a first subset of transistors on a first transistor element comprises at least one of skipping a pulse and reducing a width of a pulse of the PWM control to the first subset of transistors.

9. The electric motor circuit of claim 8, wherein altering the PWM control of the first subset of transistors on the first transistor element comprises one of maintaining the alteration for a predefined number of pulses and periodically altering a pulse according to a set period for a predefined number of pulses.

10. The electric motor circuit of claim 8, wherein altering the PWM control of the first subset of transistors on the first transistor element comprises reducing the width of the pulse of the PWM control to the first subset of transistors, and a magnitude of a reduction of the width of the pulse is dependent on a magnitude by which the detected temperature exceeds the threshold.

11. A method of operating a motor drive inverter comprising:
    receiving, at a motor controller, a plurality of temperature readings from a plurality of transistors on a transistor board, the transistor board operating as a transistor element of an inverter, wherein the plurality of temperature sensors are configured to monitor a plurality of temperatures of the transistor element; and
    altering a pulse width modulation (PWM) control of a first subset of the transistors on the transistor board in response to temperature readings of a first subset of the temperature sensors in the plurality of temperature sensors exceeding an overheating threshold and temperature readings of a second subset of the temperature sensors in the plurality of temperature sensors not exceeding the overheating threshold.

12. The method of claim 11, wherein altering the PWM control comprises at least one of skipping one or more pulses and reducing a pulse width of one or more pulses.

13. The method of claim 12, wherein reducing a pulse width of one or more pulses comprises reducing the pulse width by a magnitude corresponding to a magnitude by which the one of the temperature readings exceeds the overheating threshold.

14. The method of claim 12, wherein altering the PWM control comprises skipping at least one pulse at a periodic rate until the temperature reading falls below a second threshold.

15. The method of claim 11, wherein a number of temperature readings in the plurality of temperature readings is equal to a number of sets of thermally symmetrical regions on the transistor board, and wherein the motor controller determines a temperature at each thermally symmetrical region in one set of the thermally symmetrical regions to be a single temperature reading.

16. The method of claim 15, wherein the thermally symmetrical regions include disjoined regions.

17. The method of claim 11, wherein the transistors are positioned on the transistor board in a single row array.

18. The method of claim 11, wherein the transistors are positioned on the transistor board in a multi-row array.

19. The method of claim 11, wherein altering the PWM control of the first subset of the transistors on the transistor board further comprises maintaining standard PWM control of at least a second subset of the transistors on the transistor board.

20. A vehicle comprising:
   an energy storage system;
   a propulsion system including an electric motor, the propulsion system including an electric motor circuit for the electric motor, wherein the electric motor circuit includes:
   a motor controller having a plurality of gate drivers;
   an inverter configured to receive direct current (DC) power from a source and output alternating current (AC) power to an electric motor, the inverter including a plurality of transistor elements;
   each transistor element comprising a plurality of transistors arranged on a transistor board, wherein a plurality of temperature sensors are configured to monitor a plurality of temperatures of each transistor element; and
   wherein the motor controller is configured to alter a pulse width modulation (PWM) control of a first subset of transistors on a first transistor element in the plurality of transistor elements in response to a first subset of temperature sensors detecting a temperature exceeding a threshold temperature and a second subset of temperature sensors not detecting a temperature exceeding the threshold temperature.

* * * * *